Jan. 23, 1940.  K. H. RICH  2,188,014
VERNIER MICROSCOPE
Filed Aug. 8, 1939
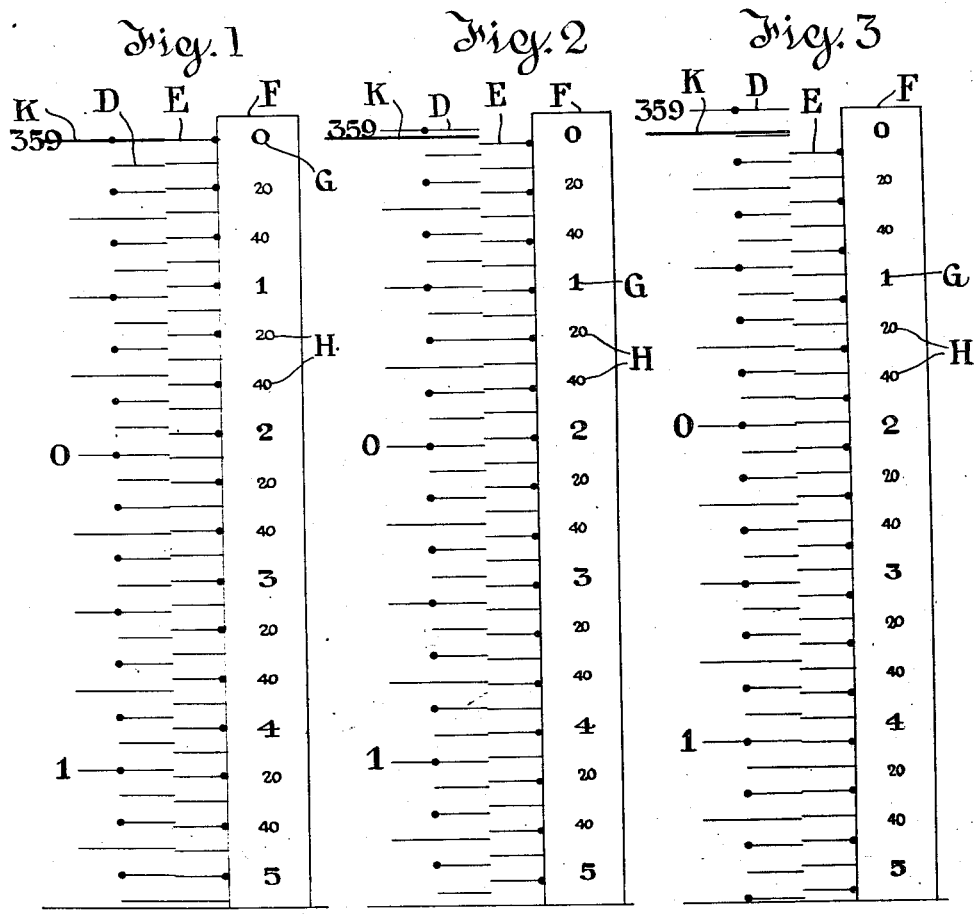
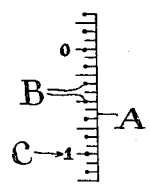
Inventor
Knowlton H. Rich
By
Attorneys Patented Jan. 23, 1940

2,188,014

UNITED STATES PATENT OFFICE 2,188,014

VERNIER MICROSCOPE

Knowlton H. Rich, Cropseyville, N. Y., assignor to W. & L. E. Gurley, Troy, N. Y., a corporation of New York Application August 8, 1939, Serial No. 289,064

3 Claims. (Cl. 88—2.6)

This invention relates to devices for reading optical verniers.

The term "optical verniers" is used to designate the type of vernier described in the patents to Egy Nos. 1,864,895 and 1,864,896 issued June 28, 1932.

According to the lower numbered patent, above-identified, the same graduated scale is read through two magnifying systems of different magnifications, one of which is erecting and the other of which is inverting. According to the second patent, two magnifying systems of the same type, (preferably both erecting) and of different magnification are used to read diametrically opposite points on a circular graduated limb. In either case, two images of the same graduated scale are secured and a suitable optical system is used to bring the two images into the same focal plane with the edges of the graduated portions in apparent contact so that one may be read against the other as a vernier.

As stated in the second of the Egy patents, the ratio of magnification for the two images is determined as follows: If $n$ represents the denominator of the fraction of the interval to be read, the ratio is $$\frac{n-1}{n+1}$$

Thus, to read tenths, the ratio is 9 to 11. Assuming a scale graduated at five-minute intervals, to be read to ten seconds, the denominator of the fraction is 30 so that the ratio is 29 to 31 in which case 29 intervals on one image of the scale subtend 31 intervals on the other image of the scale.

The problem of reading a vernier of this type is clearly stated in Patent No. 1,864,896, page 3, commencing with line 55.

When the viewing system and the scale move relatively to each other (and this is true as to the embodiments described in each of the earlier patents), one image appears to move in one direction and the other image appears to move in the opposite direction. The apparent rates of motion are different because the magnifications of the two images are different.

It is for this reason that unusual ratios suggested in the prior patents are used. The optical vernier produces, not a single progressive series of coincidences such as occurs in common verniers, but two series of coincidences, the coincidences in one series occurring alternately with those of the other. One series, the one to be used, starts at one end of the optical vernier and runs serially to the other end. The other series, not to be used, starts at mid-length, runs out at one end, simultaneously comes in at the opposite end and terminates at mid-length. It is this useless or unused series that causes the difficulty in reading such verniers.

In Patent 1,864,896, the proposal is made to use a toothed screen (designated as 54 and shown in Figure 3 of that patent) to blot out the unused or unread coincidences.

While it is technically possible to manufacture such screens, their manufacture in quantity at a reasonable cost has proved to be a difficult problem. On an ordinary horizontal limb of a transit, the graduations are at five-minute intervals. In consequence, the scale of graduations is extremely minute and the production of precise toothed screens giving ten-second intervals which can readily be indicated by the vernier is a matter of decided difficulty.

It will be observed from what is said above that while the useful series of coincidences is progressing through one-half of the vernier, the useless or unused series is progressing through the other half of the vernier.

The present invention is based on the discovery that if alternate graduations on the limb or scale be distinctively marked, then the wanted series of coincidences between images of this scale throughout the vernier range will be between similar graduations (i. e., both marked and both unmarked) and the unwanted series will be between dissimilar graduations (i. e., a marked graduation of either image coinciding with an unmarked graduation of the other image). Differentiation could be provided by various means, for example, contrasting colors, but for ease of illustration in a Patent Office drawing, I show alternate graduations, each marked by a dot. The inventive idea is differentiation, and the particular mode of differentiation is largely a matter of selection.

Since the present invention has to do with the screen and the relation of the graduations in the two images, and since the optical systems may conveniently be those shown in the Egy patents, it is deemed unnecessary to illustrate the optical system.

Adopting Fig. 1 of the Patent 1,864,895, as a basis for discussion, and assuming a scale graduated in degrees with 5-minute sub-divisions, the two optical systems there disclosed are assumed to project two real images of the same differentially magnified on a common focal plane AB (in the patent) which is the plane of the paper of Figs. 1, 2 and 3 of the present application. The screen may be in this plane and for purposes of the present discussion will be assumed to be so located, so that it corresponds in position, but not in form with the screen 28 of Fig. 1 of the patent. The optical requirement as to screen location is that it be in some focal plane of the system.

In the drawing:

Fig. 1 shows the two images and the screen as they appear when reading 359°—0—0".

Fig. 2 is a similar view but reading 359°—1'—20".

Fig. 3 is a similar view but reading 359°—4'—20".

Fig. 4 is a fragmentary view on an enlarged scale of the graduated scale or limb, which is viewed through the optical systems of the Egy patent, and which produces the images of Figs. 1, 2 and 3.

Referring first to Figure 4, the graduated scale or limb A is graduated at 5-minute intervals and every alternate graduation is distinguished from the intervening graduations by some visible means, in this case a dot B. The scale carries numerical indicia indicated at C.

Referring now to Figs. 1, 2 and 3, D represents the image of the scale A projected at the larger magnification and E represents the image of the scale projected at the smaller magnification. They are inverted, one relatively to the other, and their graduations are read against each other. Twenty-nine intervals on image D subtend thirty-one intervals on image E. The numerical indicia of the image D are visible but the numerical indicia of the image E are blanked out by a screen F which is in, or substantially in, the same plane with the real images, D and E.

This screen F bears numerical indicia, the large numbers such as G representing minutes through a range of five minutes since that is the interval on the scale A. Small indicia such as H represents seconds. There is a primary index K as in the Egy patents. This conveniently can be located in the focal plane with the images D and E, but such is not the only location theoretically possible. Obviously, as explained in the Egy patents, the primary index might be placed opposite the graduated scale A so that only an image of the index K appears on the plane of the magnified images.

The vernier is read as follows: In Figure 1 the 359° line is on index K and there are no other coincidences throughout the length of the vernier. Hence, the reading is 359°—0'—0".

Referring to Figure 2, the index K reads between 359°—0 and 359°—5'. The added vernier reading is indicated by coincidence between similar line graduations on the two images. This occurs between two dot-marked lines at 1'—20", so that the reading is 359°—1'—20".

In Figure 3, the index K is between 359°—0' and 359°—5'. The added vernier reading is indicated by a coincidence between two similar line graduations on the two scales which occurs between two unmarked lines at 4'—20", so that the reading is 359°—4'—20".

In Figure 2, the unwanted coincidence which might be read and which would be erroneous is at 3'—50". The fact that it is between dissimilar marked lines indicates that it is not to be read. A similar situation appears in Figure 3, at 2'—0".

Thus, the simple expedient of differentiating alternate graduations on the scale permits ready selection between the wanted and the unwanted series of possible coincidences on the vernier. While differentiation by the presence and absence of dots is a convenient means of illustration, various other modes of differentiation will undoubtedly suggest themselves within the broad purview of the invention. This has to do with the fact of differentiation rather than the specific means for differentiating.

What is claimed is:

1. Means for reading an optical vernier of the type in which two differentially magnified images of the same line-graduated scale appear to move in reverse directions and afford two alternating series of vernier coincidences within the same lineal range, one of which series is to be read, comprising a primary index readable against one image; and visible differentiating means applied to alternate line graduations on said scale for distinguishing the two series of vernier coincidences.

2. Means for reading an optical vernier of the type in which two differentially magnified images of the same line-graduated and number-indexed scale appear to move in reverse directions and afford two alternating series of vernier coincidences within the same lineal range comprising screening means coextensive in length with said range, exposing one image in its entirety and the line graduation of the second image, said screen bearing indicia for identifying vernier coincidences; a primary index coacting with the first image; and means directly associated with the line graduations on said scale for differentiating the two series of vernier coincidences.

3. Means for reading an optical vernier of the type in which two differentially magnified images of the same line-graduated and number-indexed scale appear to move in reverse directions and afford two alternating series of vernier coincidences within the same lineal range comprising screening means coextensive in length with said range, exposing one image in its entirety and the line graduation of the second image, said screen bearing indicia for identifying vernier coincidences; a primary index coacting with the first image; and visible differentiating means applied to alternate line graduations on said scale for distinguishing the two series of vernier coincidences.

KNOWLTON H. RICH.